United States Patent
Bellis

(10) Patent No.: US 11,485,511 B2
(45) Date of Patent: Nov. 1, 2022

(54) AIRCRAFT FEEDER CABLE SYSTEM WITH THERMOELECTRIC COOLER

(71) Applicant: Hamilton Sundstrand Corporation, Charlotte, NC (US)

(72) Inventor: Andrew David Bellis, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 336 days.

(21) Appl. No.: 16/788,955

(22) Filed: Feb. 12, 2020

(65) Prior Publication Data
US 2021/0245890 A1 Aug. 12, 2021

(51) Int. Cl.
*B64D 33/08* (2006.01)
*B64D 27/24* (2006.01)
*F25B 21/02* (2006.01)

(52) U.S. Cl.
CPC ............. *B64D 33/08* (2013.01); *B64D 27/24* (2013.01); *F25B 21/02* (2013.01)

(58) Field of Classification Search
CPC .......... B64D 27/24; B64D 33/08; F25B 21/02
USPC ...................................................... 244/53 R
See application file for complete search history.

(56) References Cited

U.S. PATENT DOCUMENTS

| | | | |
|---|---|---|---|
| 10,350,960 B1 | 7/2019 | Long | |
| 2009/0226691 A1 | 9/2009 | Manakame et al. | |
| 2010/0081572 A1 | 4/2010 | Jetter | |
| 2015/0041598 A1* | 2/2015 | Nugent | H04B 10/807 244/53 R |
| 2020/0339010 A1* | 10/2020 | Villanueva | H01M 50/249 |

FOREIGN PATENT DOCUMENTS

| | | |
|---|---|---|
| CN | 104485725 A | 4/2015 |
| DE | 102006052815 A1 | 5/2008 |
| DE | 102014007292 A1 | 11/2014 |
| EP | 3139019 A1 | 3/2017 |
| FR | 2986905 A1 | 8/2013 |
| WO | 2018014336 A1 | 1/2018 |

OTHER PUBLICATIONS

European Search Report for Application No. 21154529.8, dated Jun. 18, 2021, 130 pages.

\* cited by examiner

*Primary Examiner* — Brady W Frazier
(74) *Attorney, Agent, or Firm* — Cantor Colburn LLP

(57) ABSTRACT

Disclosed is an aircraft having an aircraft electric motor; a motor controller; a structure having ribs and spars defining a wingbox of the aircraft; a feeder cable connecting the motor controller and the aircraft electric motor through the wingbox; and a grommet defining an orifice by an inner perimeter sized to receive the feeder cable, the passage housing a thermoelectric cooler having a cooled side thermally conductive with the inner perimeter at a thermal conductivity greater than 100 watts per meter-kelvin at one ° C. and a heated side thermally conductive with the structure at the thermal conductivity.

18 Claims, 4 Drawing Sheets

AIRCRAFT FEEDER CABLE SYSTEM WITH THERMOELECTRIC COOLER

BACKGROUND

Aircraft may employ various propulsion methods. As an example, aircraft electrification may range from an all-electric based propulsion system, to a hybrid propulsion system including electric propulsion via an aircraft electric motor and fossil fuel propulsion through a piston engine or gas turbine. Aircraft propulsion systems may be associated with conduction of high electric power through the aircraft wing, fuselage structure or other exterior features, requiring cooperation with the aircraft sub-structures and other components to aid in thermal management of the high-power electrical conductors.

BRIEF DESCRIPTION

Disclosed is a support system for a feeder cable used to provide power to an electric machine associated with a wing of an aircraft. The support system has an attachment configured to attach to a structure within the wing. The support system has a thermoelectric cooler having a heated side thermally disposed on the attachment and a cooled side. The support system has a passage having an inner perimeter sized to receive the feeder cable and thermally connect to the cooled side, wherein the cooled side is thermally conductive with the inner perimeter at a thermal conductivity greater than 100 watts per meter-kelvin at one ° C. and the heated side is thermally conductive with the attachment and thereby the structure at the thermal conductivity. The support system has an inductive coil disposed near the passage such that when alternating current is passing through the feeder cable, induced current is induced in the inductive coil that is used to energize the thermoelectric cooler.

In addition to one or more of the features described above, or as an alternative, further embodiments may include the structure having ribs and spars defining a wingbox of the aircraft.

In addition to one or more of the features described above, or as an alternative, further embodiments may include an aircraft electric motor; a motor controller; and the feeder cable extending the structure and operable to conduct electric current between the motor controller and the aircraft electric motor.

In addition to one or more of the features described above, or as an alternative, further embodiments may include that the passage defines a clamp fastened to the structure with the attachment having a movable jaw cooperating with the attachment to retain the feeder cable therebetween.

In addition to one or more of the features described above, or as an alternative, further embodiments may include that the clamp consists essentially of electrically insulative and thermally conductive material.

In addition to one or more of the features described above, or as an alternative, further embodiments may include that the passage and the attachment form a grommet interference joined with the structure.

In addition to one or more of the features described above, or as an alternative, further embodiments may include that the grommet defines an outer perimeter sized to engage the structure.

In addition to one or more of the features described above, or as an alternative, further embodiments may include that the thermoelectric cooler is disposed in a middle region of the grommet defined between the inner perimeter and the outer perimeter in a radial direction.

In addition to one or more of the features described above, or as an alternative, further embodiments may include inductive coils and rectifiers defining power sources disposed within the grommet conductive with the thermoelectric cooler and operable to energize the thermoelectric cooler based on alternating current induced therein, wherein the thermoelectric cooler defines thermoelectric portions having respective first terminals and second terminals, the thermoelectric portions spaced in a circumferential direction between the inner perimeter and the outer perimeter having a one of the thermoelectric portions sandwiched by a first power source of the power sources and a second power source of the power sources to form a circuit with the first power source, a one of the first terminals, a one of the second terminals, and the second power source.

In addition to one or more of the features described above, or as an alternative, further embodiments may include that the power sources alternate with the thermoelectric portions to surround the inner perimeter.

In addition to one or more of the features described above, or as an alternative, further embodiments may include that the cooled side is electrically conductive with the inner perimeter less than 100 siemens per meter and the heated side is electrically conductive with the structure less than 100 siemens per meter.

Also disclosed is an aircraft having an aircraft electric motor; a motor controller; a structure having ribs and spars defining a wingbox of the aircraft; a feeder cable connecting the motor controller and the aircraft electric motor through the wingbox; and a grommet defining an orifice by an inner perimeter sized to receive the feeder cable, the passage housing a thermoelectric cooler having a cooled side thermally conductive with the inner perimeter at a thermal conductivity greater than 100 watts per meter-kelvin at one ° C. and a heated side thermally conductive with the structure at the thermal conductivity.

In addition to one or more of the features described above, or as an alternative, further embodiments may include a rectifier and an inductive coil disposed on the grommet and conductive with the thermoelectric cooler and operable to energize the thermoelectric cooler based on alternating current received.

In addition to one or more of the features described above, or as an alternative, further embodiments may include that the grommet is interference joined with the structure.

In addition to one or more of the features described above, or as an alternative, further embodiments may include that the grommet defines an outer perimeter sized to engage the structure.

In addition to one or more of the features described above, or as an alternative, further embodiments may include that the thermoelectric cooler is disposed in a middle region defined between the inner perimeter and the outer perimeter in a radial direction.

In addition to one or more of the features described above, or as an alternative, further embodiments may include inductive coils and rectifiers defining power sources disposed within the grommet conductive with the thermoelectric cooler and operable to energize the thermoelectric cooler based on alternating current induced therein, wherein the thermoelectric cooler defines thermoelectric portions having respective first terminals and second terminals, the thermoelectric portions spaced in a circumferential direction between the inner perimeter and the outer perimeter having a one of the thermoelectric portions sandwiched by a first power source of the power sources and a second power source of the power sources to form a circuit with the first power source, a one of the first terminals, a one of the second terminals, and the second power source.

In addition to one or more of the features described above, or as an alternative, further embodiments may include that the power sources alternate with the thermoelectric portions to surround the inner perimeter.

Also disclosed is a thermoelectric device for a feeder cable used to provide power to an electric machine associated with a wing of an aircraft. The thermoelectric device has a passage defining an orifice by an inner perimeter sized to receive the feeder cable and an outer perimeter sized to form an interference join with a structure, the passage housing the thermoelectric cooler having a cooled side thermally conductive with the inner perimeter at a thermal conductivity greater than 100 watts per meter-kelvin at one ° C. and a heated side thermally conductive with the structure at the thermal conductivity. The thermoelectric device has inductive coils; rectifiers; and power sources defined by the inductive coils and the rectifiers disposed within the passage conductive with the thermoelectric cooler and operable to energize the thermoelectric cooler based on alternating current induced therein.

In addition to one or more of the features described above, or as an alternative, further embodiments may include that the thermoelectric cooler defines thermoelectric portions having respective first terminals and second terminals, the thermoelectric portions spaced in a circumferential direction between the inner perimeter and the outer perimeter having a one of the thermoelectric portions sandwiched by a first power source of the power sources and a second power source of the power sources to form a circuit with the first power source, a one of the first terminals, a one of the second terminals, and the second power source.

In addition to one or more of the features described above, or as an alternative, further embodiments may include an aircraft electric motor; a motor controller; the structure having ribs and spars defining a wingbox of the aircraft; and the feeder cable connecting the motor controller and the aircraft electric motor through the wingbox.

BRIEF DESCRIPTION OF THE DRAWINGS

The following descriptions should not be considered limiting in any way. With reference to the accompanying drawings.

DETAILED DESCRIPTION

A detailed description of one or more embodiments of the disclosed apparatus and method are presented herein by way of exemplification and not limitation with reference to the Figures.

Figure 1:
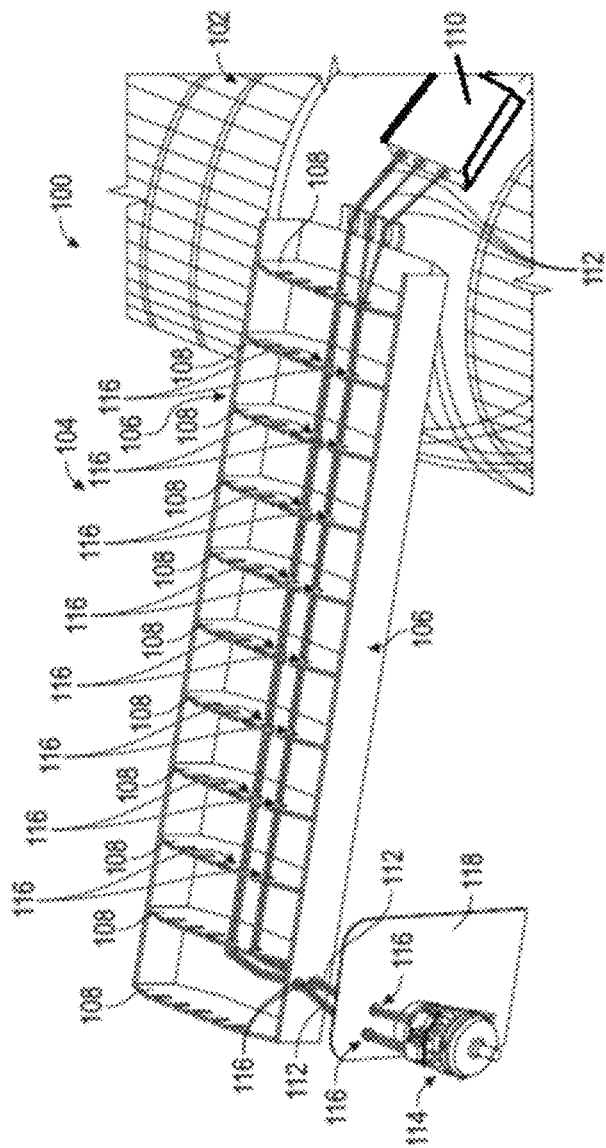
FIG. 1 illustrates a wingbox of an aircraft having electric propulsion.
Figure 2:
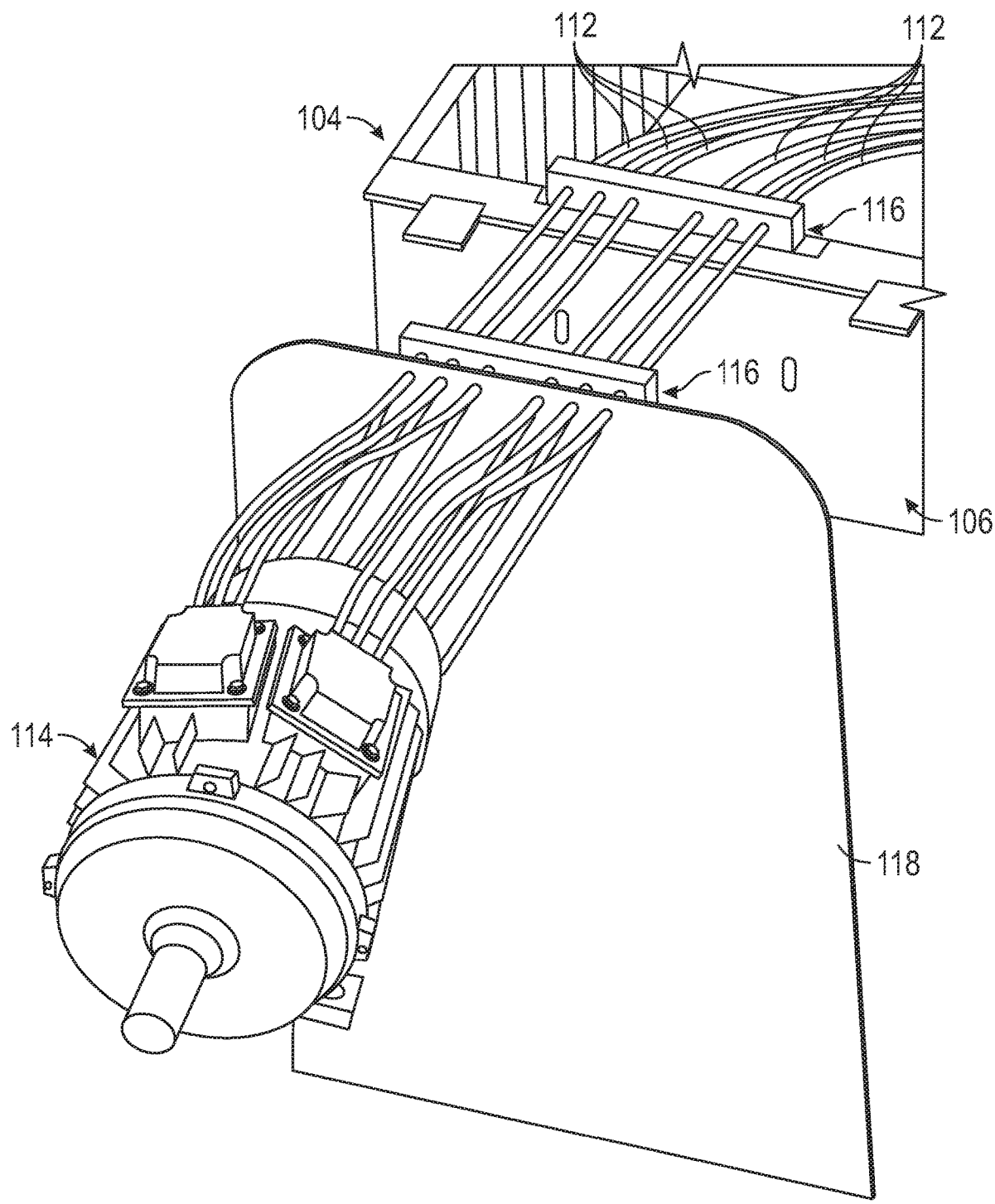
FIG. 2 illustrates a wingbox of an aircraft having a passage.

Referring to FIGS. 1-2, an aircraft 100 is illustrated. The aircraft 100 has the structure shown and having a fuselage 102 and a wingbox 104. The wingbox 104 is defined by spars 106 and ribs 108 that comprise the structure of the wingbox 104. A wing may be formed where the wingbox 104 is an internal structural element of the wing. The aircraft 100 includes an aircraft electric motor or electric machine 114. The electric machine 114 may be of any type and include any number of phases (e.g., three, six, nine). Examples of electric machines include motors and generators.

Each electric machine phase may be provided by feeder cables 112 connected with a motor controller 110 through the wingbox 104 to conduct electric current from the motor controller 110 to the electric machine 114. The feeder cables 112 are fed through passages 116 of the structure that defines the wingbox 104. As a non-limiting example, the passages 116 may traverse one of the ribs 108 and also through the passage 116. The passage may define a thermoelectric device as any combination of elements that provide heat adjustment through the thermoelectric effect. A firewall 118 may be associated with the aircraft 100.

Figure 3:
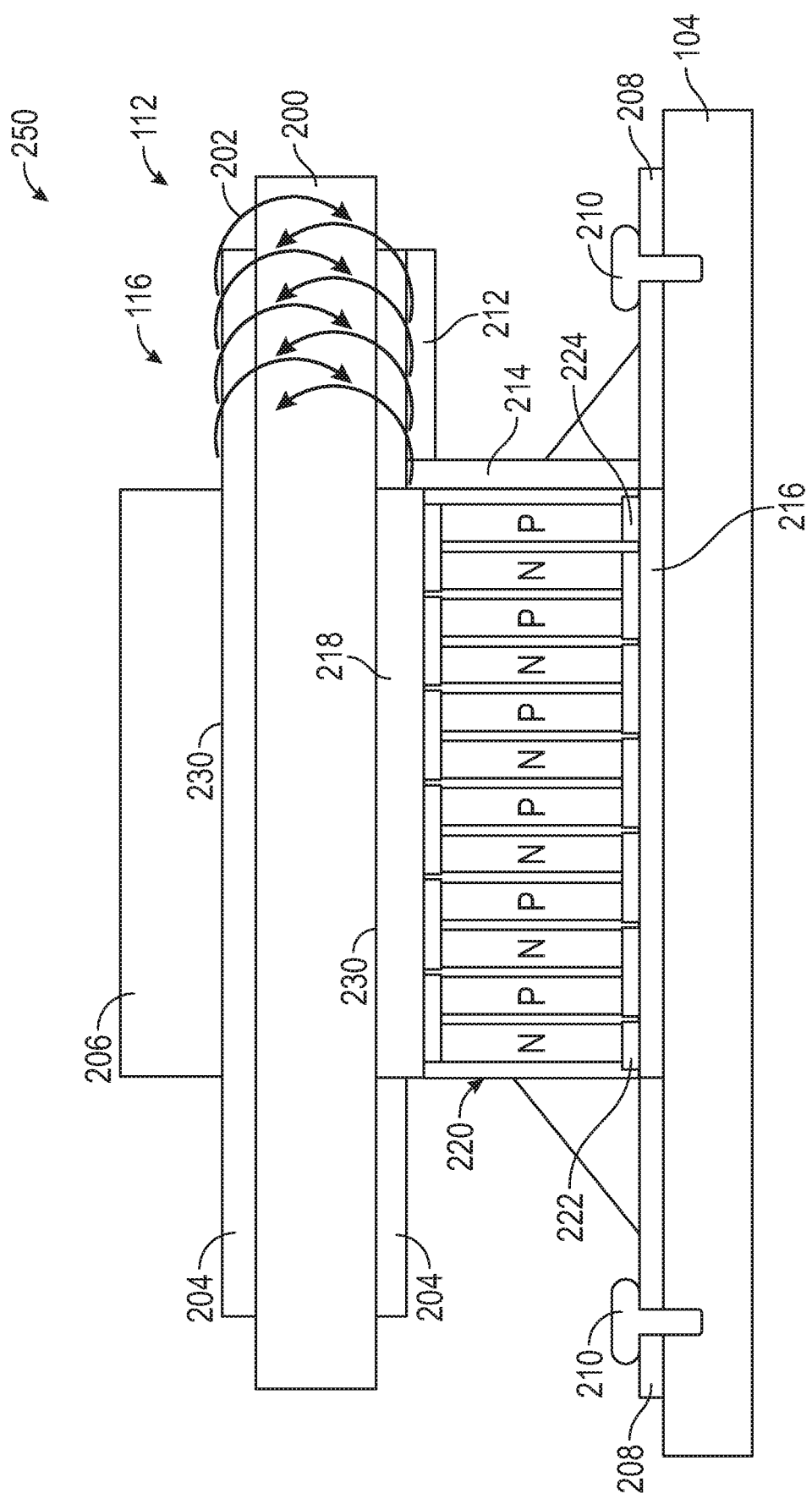
FIG. 3 illustrates a passage of an aircraft for mounting a feeder cable.

Referring to FIG. 3, a side view of a passage 116 having a support system 250 is shown. The passage 116 may define a clamp, as shown, having a movable jaw 206 and an attachment 208 operable to retain the feeder cable 112 therebetween. The clamp may be secured in any fashion, including a tightened screw. The passage 116, as shown, is secured to the structure of the wingbox 104. The passage 116 may be secured using fasteners 210. The passage 116 defines an orifice by an inner perimeter 230 sized to receive the feeder cable 112 when the clamp is secured. The feeder cable 112 may be insulated with insulation 204. A portion of the insulation 204 may be stripped during installation to mate the conductor 200 of the feeder cable 112 with a cooled side 218. The cooled side 218 may have a thermal conductivity greater than 100 watts per meter-kelvin at one ° C. and electrical resistivity of greater than 1000 ohm-meters at 20° C. The feeder cable 112 may include insulation 204 and conductor 200. All properties recited herein are at one ° C. unless otherwise designated. The heated side 216 is also thermally conductive with the structure of the wingbox 104 at a thermal conductivity greater than 100 watts per meter-kelvin at one ° C. It should be appreciated that the cooled side 218 and the heated side 216 may not directly abut respective portions of the structure or the feeder cable 112. Thermally conductive material may be disposed between such elements to improve thermal conductance. Electrically resistive material may be disposed between such elements to improve electrical resistance.

The thermoelectric cooler 220 may be disposed between the heated side 216 and the cooled side 218. The thermoelectric cooler 220 may include n-doped and p-doped pairs electrically conducting to generate the Peltier effect. The thermoelectric cooler 220 may be powered by any implement. The thermoelectric cooler 220 may be powered by direct current received from a voltage bus of the aircraft 100. The thermoelectric cooler 220 may be powered by a battery or other rechargeable devices. The thermoelectric cooler 220 may be powered by the feeder cable 112 itself. As alternating currents flow through the feeder cable 112 magnetic fields 202 may induce a current in an inductive coil 212. The inductive coil 212 may be situated near the feeder cable 112 to maximize energy capture. The inductive coil 212 may be wrapped around or partially around the feeder cable 112 to maximize energy capture. Leads from the inductive coil 212 are electrically conductive with a rectifier 214 and other electrical components (e.g., capacitor) to energize the thermoelectric cooler 220 and provide voltage to the first terminal 222 and the second terminal 224.

Figure 4:
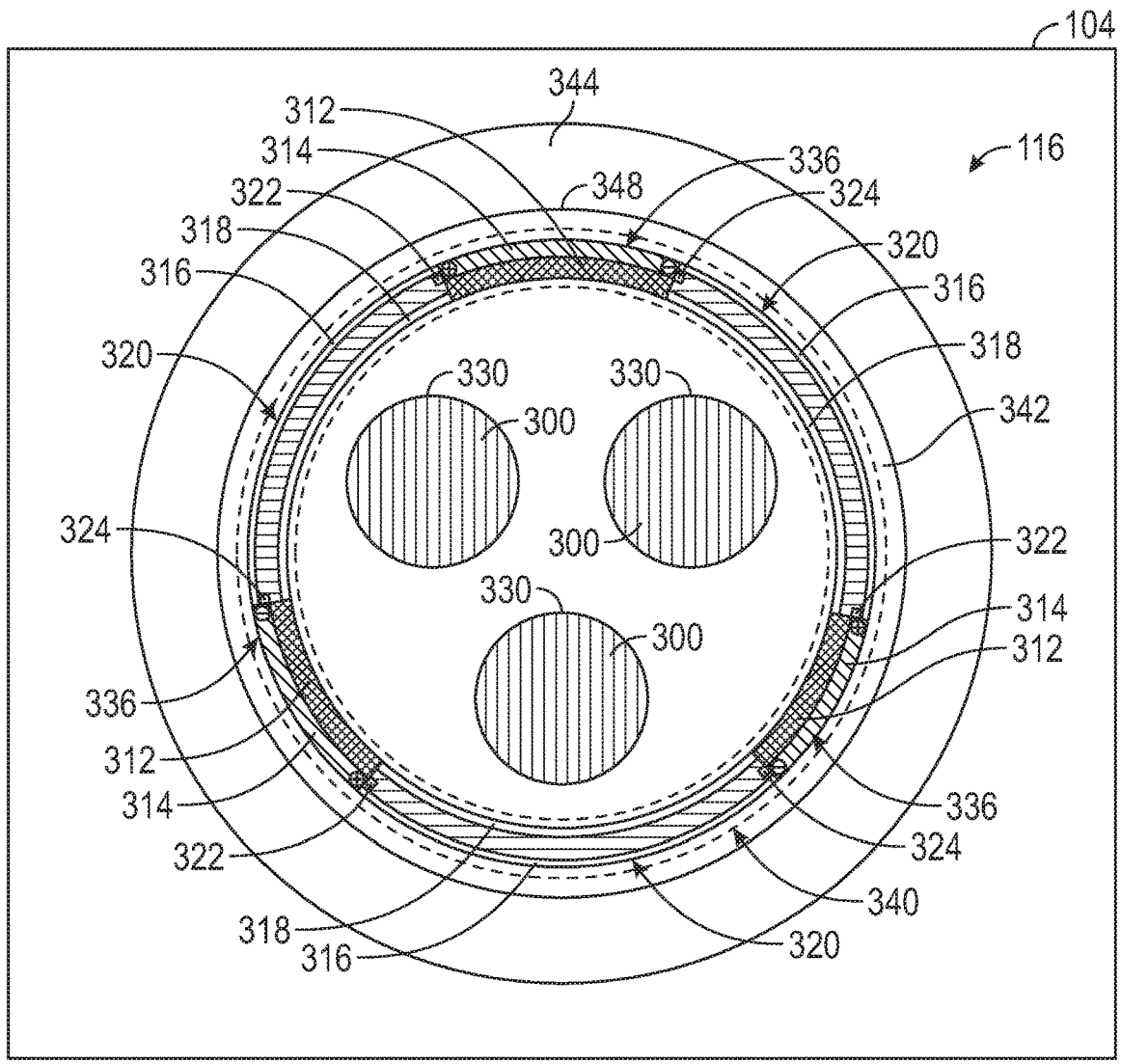
FIG. 4 illustrates a passage of an aircraft for securing a feeder cable.

Referring to FIG. 4, an example implementation of the passage 116 is shown. The passage 116 defines a grommet 342, as shown. The grommet 342 may be interference joined with the structure of the wingbox 104. The grommet 342 may have a thermal conductivity greater than 100 watts per meter-kelvin at one ° C. and electrical resistivity of greater than 1000 ohmmeters at 20° C. The passage 116 may include a flange 344. The flange 344 may be part of the structure of the wingbox 104 even though it may be subsequently or otherwise attached. As shown, conductors 300 of the feeder cables 112 extend through the grommet 342. In some implementations, the feeder cables 112 may be stripped, exposing the conductors 300. In other implementations the feeder cables 112 may include insulation. The insulation may be electrically insulative but not thermally. As such, the grommet 342 defines an orifice by an inner perimeter 330. The conductors 300, as shown, may be thermally conductive through the grommet 342 with a thermoelectric cooler 320. The thermoelectric cooler 320 may be defined by thermoelectric portions, separated as shown, in any number and dispersed through the grommet 342. The thermoelectric portions may be spaced, equidistant or otherwise, through the grommet 342 in a circumferential direction, as shown. The thermoelectric portions may have respective first terminals 322 and second terminals 324. The first terminals 322 and second terminals 324 allow a completed circuit with respect to the thermoelectric portions to be formed. The thermoelectric portions may be positioned in a radial direction between an outer perimeter 348 of the grommet 342, thermally conductive with the structure of the wingbox 104, and the inner perimeter 330.

The thermoelectric cooler 320 may include n-doped and p-doped pairs electrically conducting to generate the Peltier effect. The thermoelectric cooler 320 may be powered by any implement. The thermoelectric cooler 320 may be powered by direct current received from a voltage bus of the aircraft 100. The thermoelectric cooler 320 may be powered by a battery or other rechargeable devices. The thermoelectric cooler 320 may be powered by the feeder cable 112 itself.

The thermoelectric cooler 320 may be powered by any method mentioned or not mentioned here in. Inductive coils 312 may be disposed within the middle region to collect magnetic fields generated by the feeder cables 112. Rectifiers 314 may be disposed between respective thermoelectric portions in the circumferential direction. The rectifiers 314 may define a positive voltage for one of the thermoelectric portions and negative voltage for another, forming a conductive path. The inductive coils 312 and the rectifiers 314 may be considered power sources 336. The power sources 336 define a first power source and a second power source that sandwich the thermoelectric portions. That is, the positive output of the first power source conducts with the negative output of the second power source through the thermoelectric portion. As shown, the power sources 336 alternate with the thermoelectric portions to encircle the feeder cables 112. During operation the thermoelectric portions have an inner cooled side 318 and an outer heated side 316 that pump heat away from the feeder cables 112. The heat is pumped to the structure of the wingbox 104 and dissipated.

Figure 5:
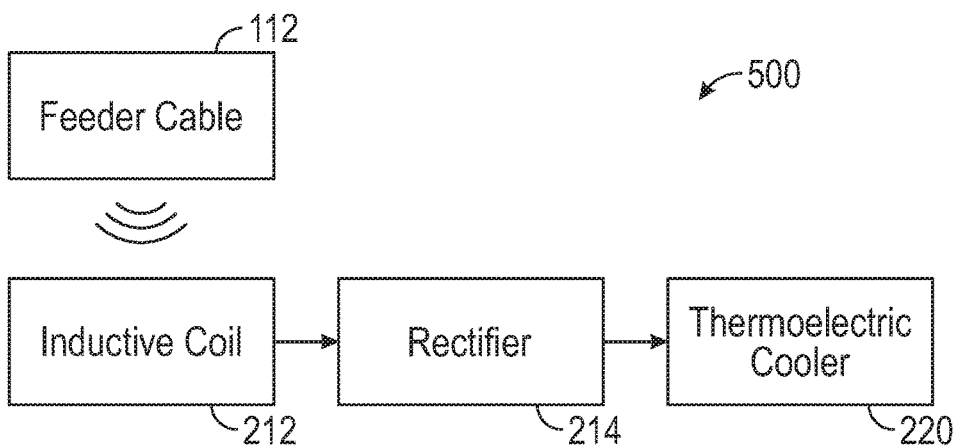
FIG. 5 illustrates an example system diagram of a passage of an aircraft.

Referring to FIG. 5, a schematic diagram 500 is shown. It should be appreciated that any of the implementations referenced herein may employ any method of energization or operation. As an example, schematic diagram 500 illustrates the feeder cable 112 energizing the inductive coil 212 or any other inductive coil 212 disclosed herein. The rectifier 214 rectifies alternating current from the inductive coil 212 for consumption by the thermoelectric cooler 220 to cool the feeder cable 112 during operation.

It should be appreciated that any combination of the foregoing may be implemented and is contemplated. Any combination of the foregoing figures may be used.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A support system for a feeder cable used to provide power to an electric machine associated with a wing of an aircraft, the support system comprising:
    an attachment configured to attach to a structure within the wing;
    a thermoelectric cooler having a heated side thermally disposed on the structure within the wing and a cooled side;
    a passage having an inner perimeter sized to receive the feeder cable and defined at least partially by the cooled side, wherein the cooled side is thermally conductive with the inner perimeter at a thermal conductivity greater than 100 watts per meter-kelvin at one ° C. and the heated side is thermally conductive with the attachment and thereby the structure at the thermal conductivity; and
    an inductive coil disposed near the passage such that when alternating current is passing through the feeder cable, induced current is induced in the inductive coil that is used to energize the thermoelectric cooler.

2. The system of claim 1 wherein the structure includes ribs and spars and defines a wingbox of the aircraft.

3. The system of claim 1 in combination with
    an aircraft electric motor; and
    a motor controller;
    wherein the feeder cable extends through the structure and is operable to conduct electric current between the motor controller and the aircraft electric motor.

4. The system of claim 3, wherein the passage is formed by a clamp having a movable jaw cooperating retain the feeder cable therebetween.

5. The system of claim 1, wherein the passage is formed in a grommet that is in contact with the structure at a grommet interface.

6. The system of claim 5, wherein the thermoelectric cooler is disposed radially inward of an outer perimeter of the grommet.

7. The system of claim 5, further comprising inductive coils and rectifiers defining power sources disposed within the grommet conductive with the thermoelectric cooler and operable to energize the thermoelectric cooler based on alternating current induced therein, wherein the thermoelectric cooler defines thermoelectric portions having respective first terminals and second terminals, the thermoelectric portions spaced in a circumferential direction between the inner perimeter and the outer perimeter having a one of the thermoelectric portions sandwiched by a first power source of the power sources and a second power source of the power sources to form a circuit with the first power source, a one of the first terminals, a one of the second terminals, and the second power source.

8. The system of claim 7, wherein the power sources alternate with the thermoelectric portions to surround the inner perimeter.

9. The system of claim 2, wherein the cooled side is electrically conductive with the inner perimeter less than 100 siemens per meter and the heated side is electrically conductive with the structure less than 100 siemens per meter.

10. An aircraft comprising:
  an aircraft electric motor;
  a motor controller;
  a structure having ribs and spars defining a wingbox of the aircraft;
  a feeder cable connecting the motor controller and the aircraft electric motor through the wingbox; and
  a grommet defining an orifice having an inner perimeter sized to receive the feeder cable, the grommet housing a thermoelectric cooler having a cooled side thermally conductive with orifice at a thermal conductivity greater than 100 watts per meter-kelvin at one ° C. and a heated side thermally conductive with the structure.

11. The aircraft of claim 10, further comprising a rectifier and an inductive coil disposed on the grommet and conductive with the thermoelectric cooler and operable to energize the thermoelectric cooler based on alternating current received.

12. The aircraft of claim 11, wherein the grommet is interference joined with the structure.

13. The aircraft of claim 12, wherein the grommet defines an outer perimeter sized to engage the structure.

14. The aircraft of claim 13, wherein the thermoelectric cooler is disposed in radially inward of the outer perimeter direction.

15. The aircraft of claim 13, further comprising inductive coils and rectifiers defining power sources disposed within the grommet conductive with the thermoelectric cooler and operable to energize the thermoelectric cooler based on alternating current induced therein, wherein the thermoelectric cooler defines thermoelectric portions having respective first terminals and second terminals, the thermoelectric portions spaced in a circumferential direction between the inner perimeter and the outer perimeter having a one of the thermoelectric portions sandwiched by a first power source of the power sources and a second power source of the power sources to form a circuit with the first power source, a one of the first terminals, a one of the second terminals, and the second power source.

16. The aircraft of claim 15, wherein the power sources alternate with the thermoelectric portions to surround the inner perimeter.

17. A thermoelectric device for a feeder cable used to provide power to an electric machine associated with a wing of an aircraft comprising:
  a passage defining an orifice having an inner perimeter sized to receive the feeder cable and an outer perimeter sized to form an interference join with a structure, the passage housing a thermoelectric cooler having a cooled side thermally conductive with and that at least in part defines the inner perimeter at a thermal conductivity greater than 100 watts per meter-kelvin at one ° C. and a heated side thermally conductive with the structure;
  inductive coils;
  rectifiers; and
  power sources defined by the inductive coils and the rectifiers disposed within the passage conductive with the thermoelectric cooler and operable to energize the thermoelectric cooler based on alternating current induced therein, wherein the thermoelectric cooler defines thermoelectric portions having respective first terminals and second terminals, the thermoelectric portions spaced in a circumferential direction between the inner perimeter and the outer perimeter having a one of the thermoelectric portions sandwiched by a first power source of the power sources and a second power source of the power sources to form a circuit with the first power source, a one of the first terminals, a one of the second terminals, and the second power source.

18. The thermoelectric device of claim 17, in combination with:
  an aircraft electric motor; and
  a motor controller;
  the feeder cable connecting the motor controller and the aircraft electric motor.

* * * * *